United States Patent [19]

Shono

[11] Patent Number: 4,649,464
[45] Date of Patent: Mar. 10, 1987

[54] DUAL OPERATING MODE SWITCHING POWER SUPPLY

[75] Inventor: Masahiro Shono, Osaka, Japan

[73] Assignee: Sanyo Electric Co., Ltd., Moriguchi, Japan

[21] Appl. No.: 755,764

[22] Filed: Jul. 17, 1985

[30] Foreign Application Priority Data

Jul. 20, 1984 [JP] Japan .................................. 59-151713
Aug. 6, 1984 [JP] Japan .................................. 59-165376
Aug. 7, 1984 [JP] Japan .................................. 59-165313

[51] Int. Cl.[4] ........................................... H02M 3/335
[52] U.S. Cl. ....................................... 363/21; 363/79; 363/97
[58] Field of Search .................... 363/14, 21, 23, 25, 363/79, 97, 131, 134

[56] References Cited

U.S. PATENT DOCUMENTS

| | | | |
|---|---|---|---|
| 3,978,393 | 8/1976 | Wisner et al. | 363/19 |
| 4,146,832 | 3/1979 | McConnell | 363/19 |
| 4,361,865 | 11/1982 | Shono | 363/19 |
| 4,456,872 | 6/1984 | Froeschle | 363/21 |
| 4,486,822 | 12/1984 | Marinus | 363/49 |
| 4,488,210 | 12/1984 | Shono | 363/19 |
| 4,524,412 | 6/1985 | Eng | 363/79 |

*Primary Examiner*—Patrick R. Salce
*Assistant Examiner*—Jeffrey Sterrett
*Attorney, Agent, or Firm*—Armstrong, Nikaido, Marmelstein & Kubovcik

[57] ABSTRACT

A power supply circuit of switching regulator type includes a converter transformer defined by a first winding for receiving input power from a DC source and second winding for producing output power, a switching transistor for alternately making and breaking electric connection between the DC source and the first winding by alternate turn on and off operations of the switching transistor, and a rectifying circuit connected to the second winding for rectifying the output power. A power supply circuit further includes a first error detector for detecting a drift in the rectified output DC current and for producing a first control signal, a second error detector for detecting a drift in the rectified output DC voltage and for producing a second control signal, and a controller for controlling the on and off operations of the switching transistor based on either one of the first control signal and the second control signal so as to stabilize the rectified output power.

14 Claims, 8 Drawing Figures

DUAL OPERATING MODE SWITCHING POWER SUPPLY

BACKGROUND OF THE INVENTION

1. Field of the Invention

The present invention relates to a power supply circuit of switching regulator type and, more particularly, to an improvement thereof which may be used as a power source for supplying power to various electric appliances, and also may be used as a charger for charging a battery, e.g., nickel-cadmium battery.

2. Description of the Prior Art

The power supply circuit of switching regulator type is disclosed in the applicant's prior U.S. Pat. No. 4,488,210, and one example is shown in FIG. 1.

According to the prior art, the power supply circuit generally includes input rectifying portion 1, blocking oscillator portion 2, converter transformer 3, error detecting portion 4, control circuit portion 5, and output rectifying portion 6. When the power switch SW is turned on, a starting current Is flows from input rectifying portion 1 to the base of switching transistor TR4, thereby activating the blocking oscillator 2. When the operation of the power supply circuit becomes stable after its start, control circuit portion 5 controls the timing when to turn-off switching transistor TR4 in accordance with the signal obtained from error detecting portion 4. The operation under the stable condition is further described below.

Under the stable condition and when switching transistor TR4 turns on, in a manner which will be described later, a current Ii (FIG. 4, waveform B) flows through transistor TR4 and input winding N1. Thus the voltage across resistor R11 gradually becomes great in the negative direction in accordance with the time. At this time, capacitor C5 is already charged in the polarity shown in FIG. 1 in the period before switching transistor TR4 turns on, i.e., during the OFF-period of transistor TR4, by a current, Ir flowing from one end of winding N3. Thus, the voltage level $V_M$ at junction M, which is connected to the emitter of transistor TR2, is always negative (FIG. 4, waveform I), and is equal to the sum of voltage across resistor R11 and voltage across capacitor C5 added to the voltage level at line L0. Thus, during the ON-period of transistor TR4, the voltage level at junction M decreases, i.e., becomes great in the negative direction.

A junction N between resistors R7 and R8 connected in series between the collector of transistor TR1 and line L0, is connected to the base of transistor TR2. The voltage level at junction N is negative and is equal to the voltage $V_N$ (FIG. 4, waveform I) which is obtained by rectifying the voltage between taps i and k of winding N3 using diode D6 and capacitor C3 and comparing the rectified DC voltage across lines L0 and L1 with the voltage determined by zener diode ZD5 at transistor TR1. Therefore, when the voltage $V_M$ at junction M becomes lower than the voltage $V_N$ at junction N, control transistor TR2 turns on and, in turn, transistor TR3 turns on. Thus, a reverse bias current IB2 (FIG. 4 waveform E) flows through capacitor C5, resistor R11, emitter-base of switching transistor TR4, emitter-collector of control transistor TR3, resistor R10 and capacitor C5, thereby turning switching transistor TR4 off. Thereafter, transistor TR4 is maintained off by the reverse bias voltage obtained between taps i and j of winding N3.

Then, switching transistor TR4 is turned on in the following manner.

During the OFF-period of transistor TR4, a resonance operation takes place by the inductance and distributed capacitance of input winding N1. When the resonant current flows in the direction indicated by Ii, a positive feedback current If (FIG. 4, waveform E) is generated from winding N3 flowing from tap j, thereby turning switching transistor TR4 on. Transistor TR4 is maintained on until it is turned off in the above described manner.

By the on and off operations of switching transistor TR4, output winding N2 of converter transformer 3 generates a voltage having a rectangular wave (FIG. 4, waveform H). The voltage obtained during the OFF-period of transistor TR4 is rectified by diode D9 and capacitor C9, thereby producing a output DC voltage from output rectifying portion 6. Also, a voltage, which is proportional to the output DC voltage, is produced between lines L0 and L1. When this voltage varies due to the condition change of the connected load in the output rectifying portion 6 or the input voltage from the source, the voltage at junction N, i.e., the base voltage of transistor TR2, varies, thereby changing the time when to turn switching transistor TR4 off. Accordingly, the voltage across the load is maintained constant. For example, when the output DC voltage should increase, the voltage across lines L0 and L1 increases in a similar manner, thereby increasing the voltage level at junction N from a negative voltage to a voltage at line L0. Thus, the time when switching transistor TR4 turns off is made faster, making the ON-period shorter. Thus, decreasing the output DC voltage to the required level.

The prior art power supply circuit of FIG. 1 as described above has the following problems.

As shown in FIG. 2, the characteristics of load current to output DC voltage according to the prior art power supply circuit is such that the constant voltage control may be carried out when the load current is below a predetermined level, but the range for effecting the constant voltage control will vary relatively to the change of the input voltage from the source, as indicated by dotted lines. This is understood from the following description. In FIG. 2, a point A represents the maximum power producing point, at which the collector current of switching transistor TR4 becomes maximum value Icp (FIG. 4, waveform D). Since the maximum value Icp is determined by $\beta$ times the positive feedback current If of transistor TR4, i.e., base current IB1 (FIG. 4, waveform E) flowing during the ON-period and also the current IB1 is proportional to the input voltage applied across input winding N1, the range for effecting the constant voltage control will vary.

If the constant voltage control range changes with respect to the change of the input voltage in a manner described above, it is necessary to provide a switching transistor TR4 which has a sufficiently high durability for the collector current operated at the maximum range and a high electric strength between collector and emitter thereof. Furthermore, other circuit components, such as capacitor C9 provided at output rectifying portion 6, should be of a type which can accept a high electric power. Thus, the circuit becomes bulky in size and results in a high manufacturing cost.

Furthermore, according to the prior art power supply circuit, although it may be suited for providing a constant voltage to a load, it is not suitable for providing a constant current to a load, such as required in charging nickel-cadmium battery.

SUMMARY OF THE INVENTION

The present invention has been developed with a view to substantially solving the above described disadvantages and has for its essential object to provide an improved power supply circuit of a switching regulator type in which the maximum power producing point may be fixed to a constant, thereby enabling the use of switching transistor having a relatively low durability for the collector current and other circuit components, such as capacitor C9 provided at output rectifying portion 6, having a relatively low electric strength.

It is also an essential object of the present invention to provide a power supply circuit of the above described type which may be used as a power source for supplying power to various electric appliances, and also as a charger for charging a battery, e.g., nickel-cadmium battery.

It is a further object of the present invention to provide a power supply circuit of the above described type which is compact in size and can readily be manufactured at low cost.

It is a still further object of the present invention to provide a power supply circuit of the above described type which can be easily turned on and turned off.

In accomplishing these and other objects, a power supply circuit of switching regulator type according to the present invention comprises a converter transformer defined by a first winding for receiving input power from a DC source and second winding for producing output power, a switching transistor means for alternately making and breaking electric connection between the DC source and the first winding by alternate turn on and off operations of the switching transistor means, and a rectifying means connected to the second winding for rectifying the output power.

According to the present invention, the power supplying circuit further comprises a first error detecting means for detecting a drift in the rectified output DC current and for producing a first control signal, a second error detecting means for detecting a drift in the rectified output DC voltage and for producing a second control signal, and a control means for controlling the on and off operations of the switching transistor means based on either one of the first control signal and the second control signal so as to stabilize the rectified output power.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENTS

Figure 3:
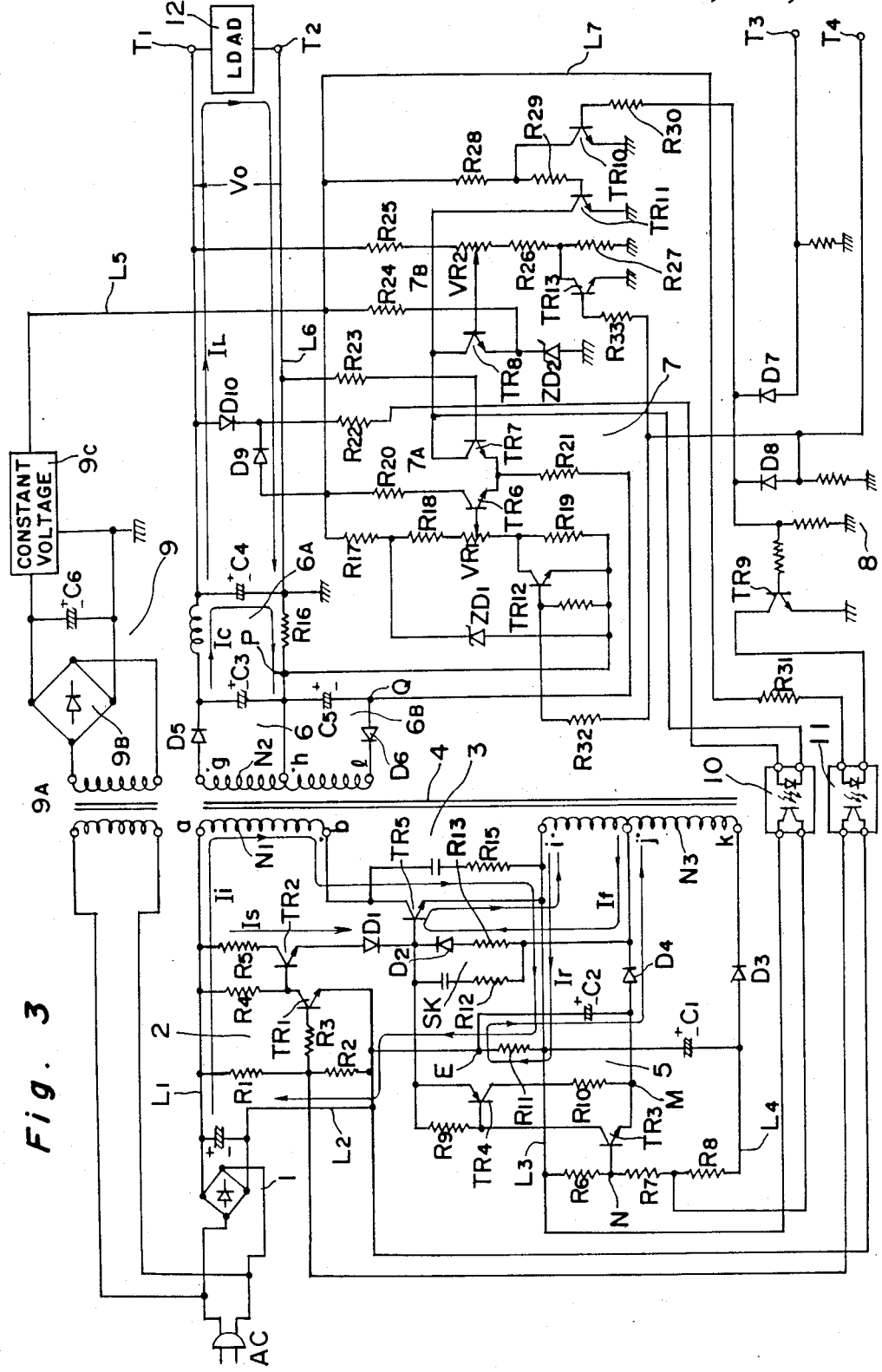
FIG. 3 is a circuit diagram of a power supply circuit of switching regulator type according to a first embodiment of the present invention.

Referring to FIG. 3, a power supply circuit of switching regulator type according to a first embodiment of the present invention is shown. The power supply circuit comprises an input rectifying portion 1 containing bridge rectifier and smoothing capacitor, starting current control portion 2, blocking oscillator 3, converter transformer 4, switch control portion 5, output rectifying portion 6, error detecting portion 7, remote control signal input portion 8 and auxiliary power source 9.

Starting current control portion 2 is defined by transistor TR1 and TR2 for making and cutting a starting current Is which is to be applied from a power line L1 extending from input rectifying portion 1 to the base of switching transistor TR5 through diode D1. The base of transistor TR1 is connected through a resistor R3 to a junction between resistor R1 and R2. Connected across resistor R2 is a second photocoupler device 11, which will be described later.

Blocking oscillator 3 is defined by a series connection of power line L1, input winding N1 of converter transformer 4, emitter-collector of switching transistor TR5, and collector current detecting resistor R11. Blocking oscillator 3 is further defined by the connection of base current control circuit SK across taps i and j of tertiary winding N3 of transformer 4 through base and emitter of transistor TR5.

Switch control portion 5 is defined by transistors TR3 and TR4 and is connected to tertiary winding N3 in the following manner. Between taps i and k of tertiary winding N3 a series connection of capacitor C1 and diode D3 is connected, and a series connection of resistors R6, R7 and R8 is connected parallel to capacitor C1. A junction N between resistors R6 and R7 is connected to the base of transistor TR3. The emitter of transistor TR3 is connected through capacitor C2 and resistor R11 to tap i. The turn on and off of transistor TR4 is controlled by the operation of transistor TR3.

Output rectifying portion 6 is defined by a first rectifying/smoothing circuit 6A connected between taps g and h of output winding N2 for producing a positive polarity voltage at an output terminal T1 with reference to the polarity of an output terminal T2, and a second rectifying/smoothing circuit 6B connected between taps h and l of output winding N2 for producing a negative voltage at a junction Q.

Error detecting portion 7 is defined by a first error detecting circuit 7A having transistors TR6 and TR7 arranged in a differential amplifier for detecting a current drift of a current Ic, which is proportional to a load current IL, flowing in the first rectifying/smoothing circuit 6A, and a second error detecting circuit 7B having a transistor TR8 for detecting a voltage drift of an output DC voltage V0 across terminals T1 and T2. First and second control signals from both error detecting circuits 7A and 7B are applied to the first photocoupler 10 and further to switch control portion 5.

Remote control signal input portion 8 is defined by a transistor TR9 having the base connected to input terminals T3 and T4 through diodes D7 and D8, respectively. Transistor TR9 is connected to photocoupler 11.

It is to be noted that a remote control signal which is either HIGH or LOW received at terminal T3 is applied through diode D7 to the base of transistor TR9 and also to the base of transistor TR10. When transistor TR10 conducts, error detection operation by error detecting portion 7 will not be carried out, a manner of which will be described later.

Also, a remote control signal which is either HIGH or LOW received at terminal T4 is applied through diode D8 to the base of transistor TR9 and also to the base of transistors TR12 and TR13. Transistors TR12 and TR13 are provided for changing the detecting range, a manner of which will be described later.

Auxiliary power source 9 is defined by a step-down transformer 9A connected to the commercial power source, a bridge rectifier 9B, a smoothing capacitor C6 and an ordinary constant voltage circuit 9C, thereby providing an auxiliary DC voltage through line L5.

The operation of the power supply circuit of FIG. 3 may be divided into three major operations: (I) On and off control of switching transistor TR5 under stable condition; (II) Stabilizing control in response to the control signals from error detecting portion 7; and (III) Make and cut control of power supply to a load, and mode selecting operation by remote control signals. Each of these major operations will be described below.

(I)

ON AND OFF CONTROL OF SWITCHING TRANSISTOR TR5 UNDER STABLE CONDITION

It is assumed the power supply circuit is now operating in a stable condition. When switching transistor TR5 turns on (the manner will be described in detail later), a current Ii (FIG. 4 waveform (B)) flows through input winding N1 and transistor TR5. Accordingly, a voltage level at a junction E between resistor R11 and capacitor C2 becomes great in the negative direction relatively to the time. During the previous OFF-period of transistor TR5, a current Ir flowing from a tap i of tertiary winding N3 charges capacitor C2 in the polarity indicated in FIG. 3. Accordingly, a junction M at which the emitter of transistor TR3 is connected has a voltage level $V_M$ which is lower than that on line L3 by a degree equal to the sum of voltage across resistor R11 and voltage across capacitor C2 (FIG. 4, waveform (I)). Thus, during the ON-period of transistor TR5, the voltage level $V_M$ gradually decreases (becomes great in the negative direction) relatively to time.

Figure 1:
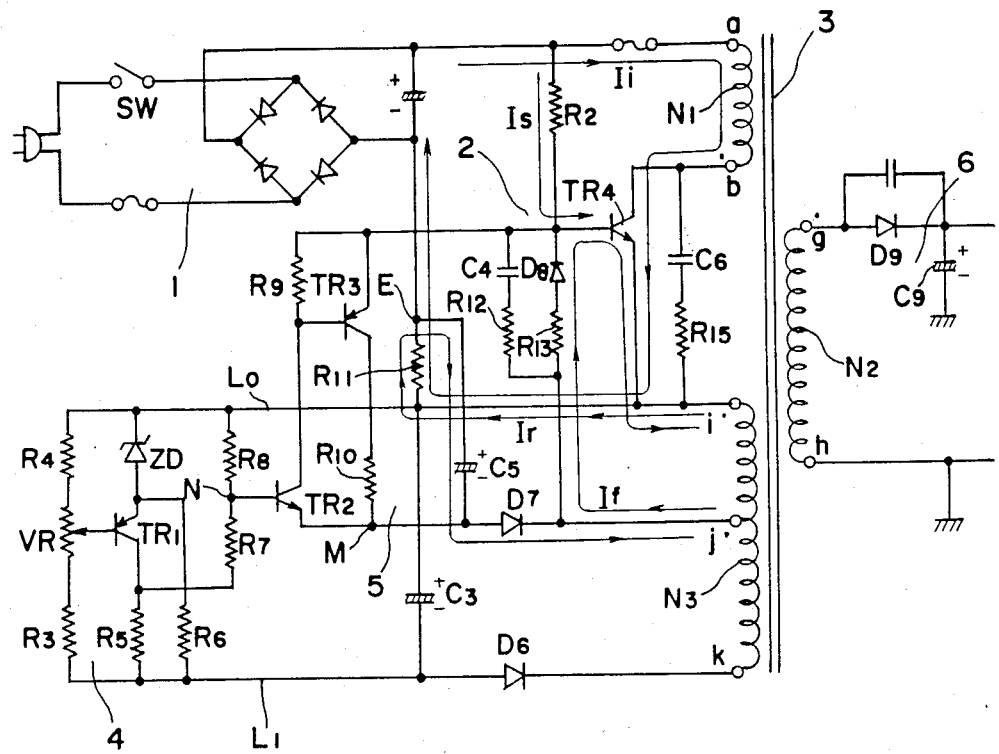
FIG. 1 is a circuit diagram of a power supply circuit of switching regulator type according to the prior art.
Figure 5:
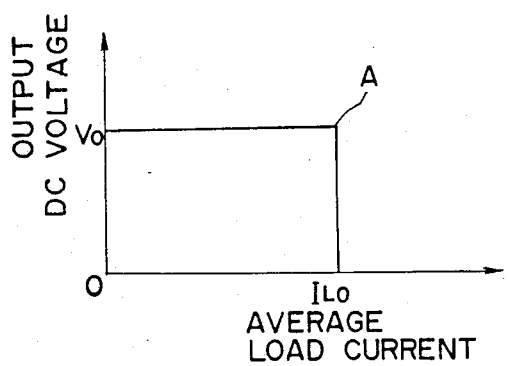
FIG. 5 is a graph showing output DC current to output DC voltage characteristic curve according to the present invention.
Figure 2:
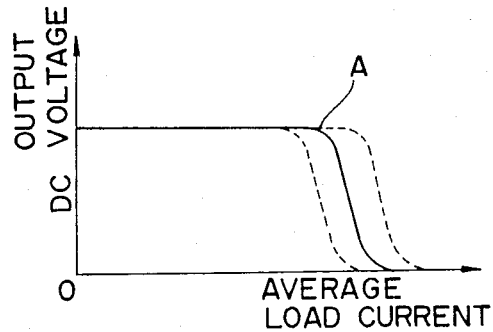
FIG. 2 is a graph showing output DC current to output DC voltage characteristic curve according to the prior art power supply circuit of FIG. 1.
Figure 4:
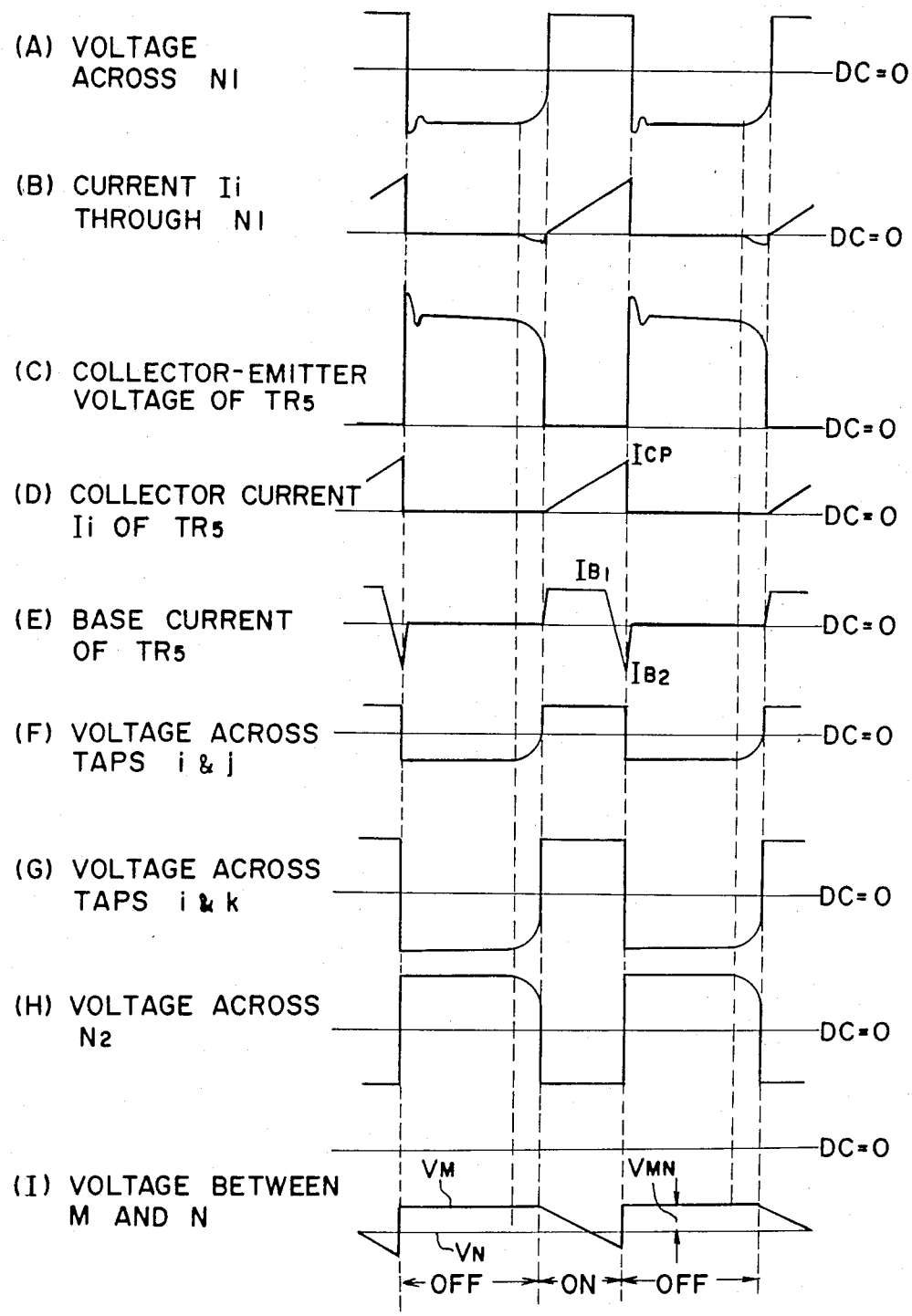
FIG. 4 is a graph showing waveforms obtained at various points in the circuit of FIG. 3.

Junction N between resistor R6 and resistors R7 and R8 which are connected between lines L3 and L4 has a negative voltage level $V_N$ (FIG. 4 waveform (I)) which is obtained by dividing the voltage between lines L3 and L4 obtained by rectifying and smoothing the voltage between taps i and k of tertiary winding N3 by diode D3 and capacitor C1. When the voltage level $V_M$ becomes lower than the voltage level $V_N$, transistor TR3 turns on and, thus transistor TR4 also turns on. Accordingly, a negative bias current flows through capacitor C2, resistor R11, emitter-base of transistor TR5, collector-emitter of transistor TR4, resistor TR10 and capacitor C2, thereby turning transistor TR5 off. Until transistor TR5 is turned on again, it is maintained off by a reverse voltage (FIG. 2, waveform (F)) between taps i and j of tertiary winding N3.

At the trailing end portion of the off period of transistor TR5, a resonance operation takes place by the inductance and distributed capacitance of input winding N1. When the resonance current is directed in the same direction as current Ii, a positive feedback current If (FIG. 4, on period in waveform (E)) flows from tap j of tertiary winding N3 through resistor R13, diode D2 and transistor TR5, thereby turning transistor TR5 on. Until transistor TR5 is turned off by the above described operation, it is maintained on. Accordingly, by repeating the on and off operation of transistor TR5, the circuit produces a rectangular waveform, such as shown in FIG. 4(H) across output winding N2 of converter transformer 4, particularly between taps g and h and also between taps h and l. Then, by the first rectifying/smoothing circuit 6A, the voltage during the off period of the rectangular waveform voltage produced between taps g and h of winding N2 is converted to DC voltage, whereas by the second rectifying/smoothing circuit 6B, the voltage during the off period of the rectangular waveform voltage produced between taps h and l of winding N2 is converted to DC voltage.

(II)

STABILIZING CONTROL

Since transistors TR10 and TR11 which are for inhibiting the detection operation, and transistors TR12 and TR13 which are for changing the detection mode are not essential for the stabilizing control, the description herein below are given with an assumption that none of transistors TR10, TR11, TR12 and TR13 is connected.

It is assumed that a load 12 connected between output terminals T1 and T2 has a great inpedance, and that a constant output DC voltage V0 is produced across output terminals T1 and T2. Since load 12 has a great impedance, the load current IL flowing through load 12 from capacitor C4 is very small. Therefore, a current Ic, which is proportional to current IL, is very small too. Accordingly, a voltage level on line L6 with reference to voltage level at a junction P located at one end of resistor R16, i.e., voltage level at the base of transistor TR7 is lower than the voltage level at the base of transistor TR6 as obtained by dividing the voltage across zener diode ZD1 by resistors R18, R19 and variable resistor VR1. Thus, transistor TR7 is off. At this time, since a rated output DC voltage is being produced across output terminals T1 and T2, the base of transistor TR8 of the second error detecting circuit 7B is HIGH and, therefore, this transistor is in conductive state.

Thus, a collector current of transistor TR8 flows from line L5 of auxiliary power source 9 through diode D9, resistor R22, the light emitting diode of the first photocoupler 10, transistor TR8 in the second error detecting circuit 7B, zener diode ZD2 to ground, thereby the photocell, such as a phototransistor, provided in photocoupler 10 changes its impedance in accordance with the amount of current flow through the light emitting diode in photocoupler 10.

Then, when the output DC voltage V0 increases, the collector current of transistor TR8 increases, resulting in the decrease of impedance of phototransistor in the photocoupler 10. Thus, the voltage level at junction N in switch control portion 5 increases, thereby making the on period of switching transistor TR5 short. Thus, the output DC voltage is reduced.

Now, it is assumed that the impedance of load 12 has reduced greatly. Accordingly, the output DC voltage V0 across output terminals T1 and T2 becomes very small, thereby turning off transistor TR8 in the second error detecting circuit 7B. Also, the output DC current IL increases, thereby increasing the current Ic flowing through resistor R16. Accordingly, the voltage level on line L6 with reference to the voltage level at junction P increases, making transistors TR6 and TR7 in the conductive condition.

Therefore, a current now flows from line L5, diode D9, resistor R22, light emitting diode in the first photocoupler 10, transistor TR7, resistor R21, capacitor C5 and resistor R16 and ground. If the output load current IL further increases, current IC increases to increase the voltage level at one end of resistor R16, remote from junction P. Thus, the base biasing voltage of transistor TR7 increases to increase the current flowing therethrough. Accordingly, the current flowing through the light emitting diode increases, thereby decreasing the impedance of phototransistor in the first photocoupler 10. Accordingly, the on period of switching transistor TR5 is made short to prevent the further increase of load current IL, thereby limiting the maximum load current within a predetermined level. Accordingly, the output DC power produced between output terminals T1 and T2 under the above described condition can be given by mode I indicated in FIG. 6.

Although the foregoing description is directed to a case wherein a constant voltage operation mode is changed to constant current operation mode caused by the reduction of load impedance, the same can be said to a case wherein the operation change from a constant current operation mode to constant voltage operation mode.

(III)

MAKE AND CUT CONTROL OF POWER SUPPLY TO A LOAD, AND MODE SELECTING OPERATION

When input terminals T3 and T4 are receiving LOW, or open, transistor TR9 is off, thereby preventing current from flowing through light emitting diode of photocoupler 11. Thus, the phototransistor in photocoupler 11 is in OFF state. Accordingly, voltage divided by resistors R1 and R2 connected between lines L1 and L2 is applied through resistor R3 to the base of transistor TR1. Thus, transistor TR1 turns on and transistor TR2 turns off. Therefore, the starting current Is will not flow from line L1 to the base of switching transistor TR5. Thus, no blocking oscillation takes place.

Also, at this time, transistor TR10 in detecting portion 7 is off, thereby maintaining transistor TR11 on (in the saturated condition). Thus, a current flows from line L5 through diode D6, resistor R22, light emitting diode in photocoupler 10, collector-emitter of transistor TR11 to ground, thereby saturating the phototransistor in photocoupler 10. Accordingly, a series connection of resistors R6 and R7 in switching control portion 5 is shortcircuited, thereby setting the base voltage of transistor TR3 to approximately zero with respect to the voltage level of line L3. Thus, transistor TR3 becomes very sensitive such that transistor TR3 turns on even by a very small amount of current flowing through resistor R11.

As apparent from the foregoing description, by cutting the starting current Is, it is possible to prevent switching transistor TR5 from being turned on. Even if it did turn on for some reason or other, transistors TR3 and TR4 turn on immediately to turn off transistor TR5. In this manner, switching transistor TR5 is maintained substantially in the off condition.

Next, when input terminal T3 receives HIGH upon actuation of a remote controller (not shown), transistor TR9 turns on. Accordingly, a current flows from line L5 through Line L7, resistor R31, light emitting diode in the second photocoupler 11, collector-emitter of transistor TR9 to ground. Therefore, the phototransistor in photocoupler 11 turns on. Accordingly, resistor R2 in starting current control portion 2 is shortcircuited, thereby turning transistor TR1 off and transistor TR2 on. Thus, the starting current Is flows through transistor TR2, diode D1 to the base of transistor TR5, thereby setting the circuit in a condition for permitting the blocking oscillation.

Also, when input terminal T3 receives HIGH, transistor TR10 turns on, thereby turning transistor TR11 off. Accordingly, transistor TR11 has no influence on error detecting portion 7 and switch control portion 5. Thus, error detecting portion 7 and switch control portion 5 will carry out the stabilization control in a manner described above under item (II) when blocking oscillator 3 is driven, thereby supplying a predetermined stable DC output power to load 12.

Under the above described condition, input terminal T4 is receiving LOW and, therefore, transistor TR12 and TR13 are maintained off. Thus, the first error detecting circuit 7A is provided with a first reference voltage, which is relatively high, to the base of transistor TR6. The first reference voltage, which is relatively high, is set by dividing the voltage across zener diode ZD1 by resistors R18 and R19 and variable resistor VR1. And, at the same time, the voltage to be detected in the second error detecting circuit 7B, which is relatively high, is obtained by dividing the output DC voltage V0 by resistors R25, R26 and R27 and variable resistor VR2. Therefore, under this condition, the stabilized DC output power will be as shown by mode (I) in FIG. 6. Under mode (I), transistor TR7 in the first error detecting circuit 7A operates when a great amount of current flows through load 12, whereas transistor TR8 in the second error detecting circuit 7B operates when the output DC voltage V0 between terminals T1 and T2 is relatively small.

Next, when input terminal T4 receives HIGH upon actuation of a remote controller (not shown), transistor TR9 turns on, thereby turning transistor TR10 on. Thus, the switching power source circuit operates in the same manner as described above. In this case, transistors TR12 and TR13 are both turned on. By the turn on of transistor TR12, resistor R19 is shortcircuited, thereby dividing the voltage across zener diode ZD1 by resistor R18 and variable resistor VR1. Thus, the first error detecting circuit 7A is provided with a second reference voltage, which is lower than that of the first reference voltage, to the base of transistor TR6. Also, by the turn on of transistor TR13, the voltage to be detected in the second error detecting circuit 7B is obtained by dividing the output DC voltage V0 by resistors R25 and R26 and variable resistor VR2, resulting in a lower detecting voltage than before. Therefore, under this condition, the stabilized output DC power will be as shown by mode (II) in FIG. 6. Under mode (II), transistor TR7 in the first error detecting circuit 7A operates even by a small amount of load current IL flowing through load 12, whereas transistor TR8 in the second error detecting circuit 7B operates only when the output DC voltage V0 between terminals T1 and T2 is relatively great.

Figure 6:
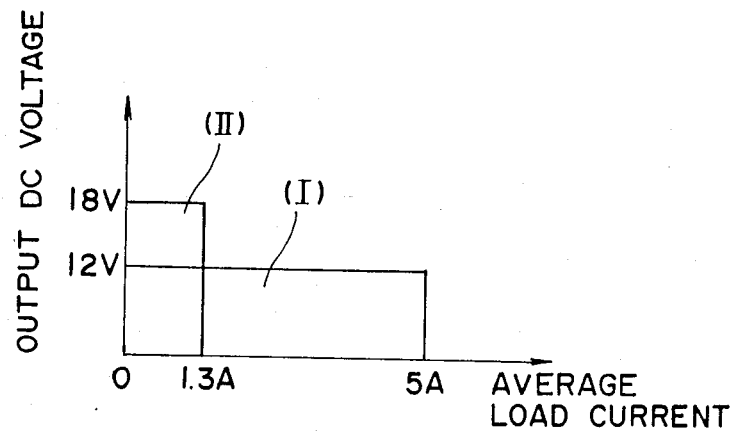
FIG. 6 is a graph showing output DC current to output DC voltage characteristic curves operated under two different modes according to the present invention.

As apparent from the graph of FIG. 6, mode (I) is appropriate to a case wherein the load current may vary in a wide range with the output DC voltage being maintained constant. For example, mode (I) is selected when the impedance of the load changes in a wide range, such as when the load is a motor. From this view point, mode (I) can be said as a constant voltage mode.

On the contrary, mode (II) is appropriate to a case wherein the output DC voltage may vary in a wide range with the load current being maintained constant. For example, mode (II) is selected when a battery, such as a Ni-Cd battery is to be charged. From this view point, mode (II) can be said as a constant current mode.

Figure 7:
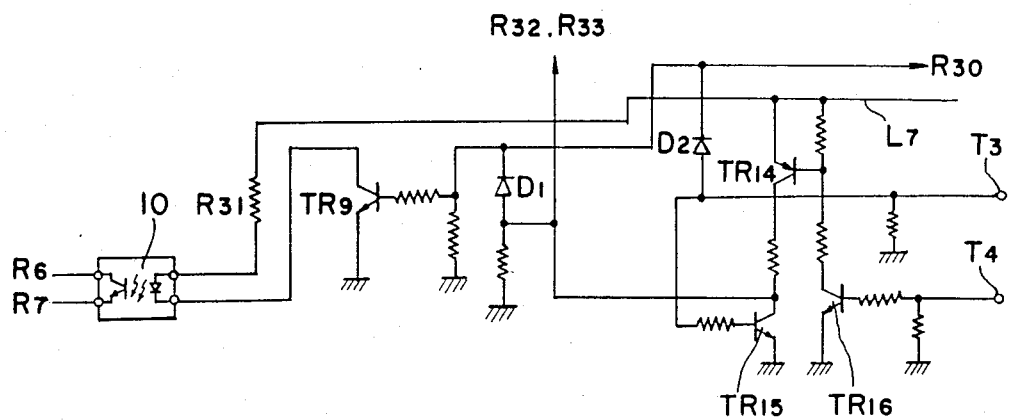
FIG. 7 is a circuit diagram showing a remote controller input portion according to a modification of the first embodiment.

In the case where both input terminals T3 and T4 receive HIGH, the mode to be selected (priority mode) is the constant current mode (II). However, is remote control signal input portion 8 is arranged in a manner shown in FIG. 7, the priority mode may be set as the constant voltage mode (I).

It is to be noted that diode D10 provided in output rectifying portion 6 is for supplying current from output terminal T1 to light emitting diode in photocoupler 10 when a problem should take place in constant voltage source 9C in auxiliary power source 9 to drop the DC voltage on line L5. Therefore, diode D10 is maintained off during the normal operation, that is when the auxiliary DC voltage on line L5 is slightly greater than the output DC voltage V0.

Figure 8:
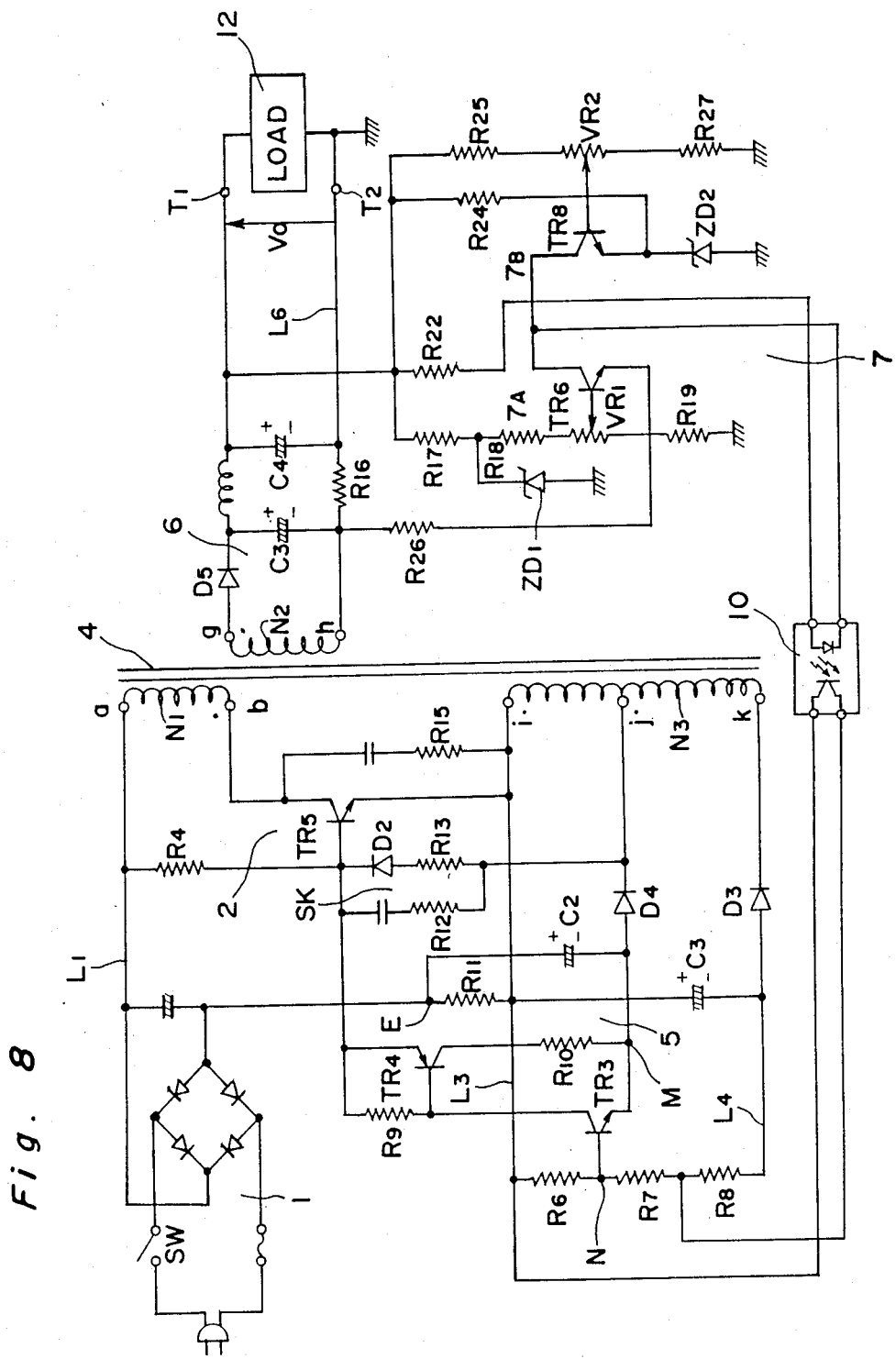
FIG. 8 is a circuit diagram of a power supply circuit according to a second embodiment of the present invention.

Referring to FIG. 8, a power supply circuit of switching regulator type according to a second embodiment of the present invention is shown. According to this embodiment, a circuit for controlling the make and cut of power supply to the load and a circuit for changing the mode between constant current operation mode and constant voltage operation mode are not provided. Accordingly, transistors TR1, TR2, TR9, TR10, TR11, TR12 and TR13 and photocoupler 11 and their associated elements are not provided. Furthermore, according to this embodiment, the error detecting circuit 7A is defined by one transistor TR6. Its operation is similar to that of the first embodiment. When compared with the first embodiment, second rectifying/smoothing circuit 6B is not necessary and, therefore, output winding N2 may be simplified to eliminate a winding section between taps h and l. However, there may be a fear of a little fluctuation in the load current due to the fluctuation of an operating point caused by the drift of temperature or difference in the base-emitter voltage among manufactured transistors for transistor TR6, or caused when the resistance of resistor R16 is small.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of the appended claims.

What is claimed is:

1. A power supply circuit of a switching regulator type, comprising:
    a converter transformer defined by a first winding for receiving input power from a DC source and second winding for producing output power;
    switching transistor means for alternately making and breaking electric connection between said DC source and said first winding by alternate turn on and off operations of said switching transistor means;
    rectifying means connected to said second winding for rectifying said output power;
    first error detecting means for detecting a drift in the rectified output DC current and for producing a first control signal;
    second error detecting means for detecting a drift in the rectified output DC voltage and for producing a second control signal;
    control means for controlling said on and off operation of said switching transistor means based on either one of said first control signal and said second control signal so as to stabilize the rectified output power; and
    a mode selecting means coupled to said first and second error detecting means for changing the mode between a constant current mode in which the rectified output power is stabilized to provide a constant current for a relatively wide range of output DC voltage, and a constant voltage mode in which the rectified output power is stabilized to provide a constant voltage for a relatively wide range of output DC current.

2. A power supply circuit as claimed in claim 1, wherein said first error detecting means comprises a first transistor which changes its conductivity relatively to a current flowing through said rectifying means, and a first signal generating means for generating said first control signal.

3. A power supply circuit as claimed in claim 2, wherein said first signal generating means comprises a photocoupler.

4. A power supply circuit as claimed in claim 1, wherein said first error detecting means comprises a differential amplifier, defined by a pair of first and second transistors, which changes its conductivity relative to a current flowing through said rectifying means, and a first signal generating means for generating said first control signal.

5. A power supply circuit as claimed in claim 4, wherein said first signal generating means comprises a photocoupler.

6. A power supply circuit as claimed in claim 4, wherein said second error detecting means comprises a third transistor which changes its conductivity relatively to a voltage across said rectifying means, and a second signal generating means for generating said second control signal.

7. A power supply circuit as claimed in claim 6, wherein said second signal generating means comprises a photocoupler.

8. A power supply circuit as claimed in claim 1, further comprising an enable/disable control means coupled to said first and second error detecting means for enabling and disabling said first and second error detecting means.

9. A power supply circuit as claimed in claim 1, further comprising an ON/OFF control means coupled to said switching transistor means for making and cutting the flow of a starting current to the base of said switching transistor means.

10. A power supply circuit of a switching regulator type, comprising:

a converter transformer defined by a first winding for receiving input power from a DC source and second winding for producing output power;

switching transistor means for alternately making and breaking electric connection between said DC source and said first winding by alternate turn on and off operations of said switching transistor means;

rectifying means connected to said second winding for rectifying said output power;

first error detecting means for detecting a drift in the rectified output DC current and for producing a first control signal, said first error detecting means comprising a differential amplifier, defined by a pair of first and second transistors, which changes its conductivity relatively to a current flowing through said rectifying means, and a first signal generating means for generating said first control signal;

second error detecting means for detecting a drift in te rectified output DC voltage and for producing a second control signal, said second error detecting means comprising a third transistor which changes its conductivity relatively to a voltage across said rectifying means, and a second signal generating means for generating said second control signal;

control means for controlling said on and off operations of said switching transistor means based on either one of said first control signal and said second control signal so as to stabilize the rectified output power; and a mode selecting means coupled to said first and second error detecting means to alter said first and second reference voltages, thereby changing the mode between a constant current mode in which the rectified output power is stabilized to provide a constant current for a relatively wide range of output DC voltage, and a constant voltage mode in which the rectified output power is stabilized to provide a constant voltage for a relatively wide range of output DC current.

11. A power supply circuit as claimed in claim 10, wherein said first error detecting means further comprises a first reference voltage circuit for providing a reference voltage to the base of said first transistor, and wherein said second error detecting means further comprises a second reference voltage circuit for providing a reference voltage to the emitter of said third transistor.

12. A power supply circuit as claimed in claim 10, wherein said first and second signal generating means comprise a photocoupler.

13. A power supply circuit as claimed in claim 10, wherein said first error detecting means further comprises a first reference voltage circuit for providing a reference voltage to the base of said first transistor.

14. A power supply circuit as claimed in claim 13, wherein said second error detecting means further comprises a second reference voltage circuit for providing a reference voltage to the emitter of said third transistor.

* * * * *